US009419906B2

(12) United States Patent
Lundin (10) Patent No.: US 9,419,906 B2
(45) Date of Patent: Aug. 16, 2016

(54) NETWORK CONGESTION CONTROL WITH ADAPTIVE QOS BIT-RATE DIFFERENTIATION

(75) Inventors: Erik Geijer Lundin, Stockholm (SE); Leif Lundin, legal representative, Stockholm (SE)

(73) Assignee: TELEFONAKTIEBOLAGET L M ERICSSON, Stockholm (SE)

(*) Notice: Subject to any disclaimer, the term of this patent is extended or adjusted under 35 U.S.C. 154(b) by 0 days.

(21) Appl. No.: 14/129,365

(22) PCT Filed: Jul. 5, 2011

(86) PCT No.: PCT/EP2011/003326
§ 371 (c)(1),
(2), (4) Date: Mar. 25, 2014

(87) PCT Pub. No.: WO2013/004256
PCT Pub. Date: Jan. 10, 2013

(65) Prior Publication Data
US 2014/0219082 A1    Aug. 7, 2014

(51) Int. Cl.
*H04L 12/825* (2013.01)
*H04L 12/801* (2013.01)
(Continued)

(52) U.S. Cl.
CPC .............. *H04L 47/25* (2013.01); *H04L 47/12* (2013.01); *H04L 47/14* (2013.01); *H04L 47/193* (2013.01);
(Continued)

(58) Field of Classification Search
CPC .......... H04W 72/1278; H04W 76/025; H04W 72/1247; H04W 28/14; H04W 92/12; H04W 72/1252; H04L 47/283; H04L 47/14
See application file for complete search history.

(56) References Cited

U.S. PATENT DOCUMENTS

| 7,035,214 B1* | 4/2006 | Seddigh et al. ............... 370/231 |
| 2012/0163205 A1* | 6/2012 | Zhang et al. .................. 370/252 |
| 2012/0263120 A1* | 10/2012 | Gopalakrishnan et al. ........................... 370/329 |

FOREIGN PATENT DOCUMENTS

| WO | 2010036168 A1 | 4/2010 |
| WO | 2010107348 A1 | 9/2010 |

OTHER PUBLICATIONS

Harrison, D. et al., "An Accumulation-Based, Closed-Loop Scheme for Expected Minimum Rate and Weighted Rate Services," Computer Networks; Eksevier B.V. 2004. pp. 801-818.

(Continued)

*Primary Examiner* — Jung-Jen Liu
(74) *Attorney, Agent, or Firm* — Patents on Demand, P.A.; Brian K. Buchheit; Scott M. Garrett (57) ABSTRACT

A method is provided for congestion control in a network node (114; 510; 700; 900) of a communication network (701). The network node handles a plurality of data connections ($DC_{1-N}$; $RAB_{1-N}$) for conveying data between a first side and a second side of the communication network. The congestion control involves associating the data connections with respective target weights ($w_k$; k=1-N) for Quality-of-Service (QoS) bit-rate differentiation. The method comprises the following steps, performed in the network node. Experienced bit-rates ($r_k$=1-N) are obtained (620) for the data connections ($DC_{1-N}$; RAB 1-N). For each data connection ($DC_i$; RAB i), a time integrated difference is determined (632) between the data connection's targeted bit-rate according to its target weight ($w_i$), and its experienced bit-rate ($r_i$). Then, for each data connection, an adjusted weight ($w'_i$) for QoS bit-rate differentiation is calculated (634) based on the determined time integrated difference and the target weight ($w_i$). The adjusted weights ($w'_k$; k=1-N) are used for the congestion control of the data connections.

13 Claims, 7 Drawing Sheets

(51) Int. Cl.
*H04L 12/851* (2013.01)
*H04L 12/823* (2013.01)
*H04W 28/22* (2009.01)
*H04L 12/833* (2013.01)

(52) U.S. Cl.
CPC ............ *H04L 47/24* (2013.01); *H04L 47/2458* (2013.01); *H04L 47/32* (2013.01); *H04L 47/34* (2013.01); *H04W 28/22* (2013.01)

(56) References Cited

OTHER PUBLICATIONS

Cai, L. et al., "A QoS-Aware AIMD Protocol for Time-Sensitive Applications in Wired/Wireless Networks," IEEE; Infocom 2005. 24th Annual Joint Conference of the IEEE Computer and Communications Societies. Mar. 13-17, 2005. pp. 2008-2019.

* cited by examiner

Fig 8

NETWORK CONGESTION CONTROL WITH ADAPTIVE QOS BIT-RATE DIFFERENTIATION

TECHNICAL FIELD

The present invention relates to network congestion control, and more particularly to a method for congestion control in a network node of a communication network, where the network node is adapted to handle a plurality of data connections for conveying data between a first side and a second side of the communication network, and where the congestion control involves associating the data connections with respective target weights for Quality-of-Service (QoS) bit-rate differentiation. The invention also relates to a network node, computer program product and computer readable medium adapted to perform the method.

BACKGROUND

Network congestion can basically appear in any part of a complex communication network where potential bottlenecks may occur as a result of insufficient network throughput capacity in relation to the (momentary) communication traffic load. One common example, which will be adhered to in this document, is the transport network in a mobile telecommunications system.

In recent years, the functionality offered by mobile telecommunications systems has been expanded from pure (circuit-switched) voice communication to a variety of services in addition to voice calls. Many of these additional services employ packet-switched data communication between a server and a mobile terminal, or between two mobile terminals, over the mobile telecommunications network and associated wide area networks such as the Internet. For instance, the 3G/UMTS (3rd Generation/Universal Mobile Telecommunications System) architecture involves packet-based communication in accordance with the High Speed Packet Access (HSPA) protocol set, including High Speed Downlink Packet Access (HSDPA) for downlink communication and High Speed Uplink Packet Access (HSUPA), also known as Enhanced Uplink (EUL), for uplink communication. These protocols are defined in the 3rd Generation Partnership Project (3GPP) specifications.

In any packet-switched communication system, problems like packet losses or congestion between competing data flows can occur at various locations in the system. Data flow control is therefore provided at several levels in the protocol architecture. For instance, in the 3G/UMTS (3rd Generation/Universal Mobile Telecommunications System) architecture, the Transmission Control Protocol (TCP) may be applied on an upper level between a TCP server and an end-user application in a mobile terminal (user equipment, UE). Radio Link Control (RLC) is applied between a Serving Radio Network Controller (SRNC) and a UE, whereas HSPA Flow Control (FC) is applied to HSPA traffic flows over the Transport Network (TN; Iub) between an SRNC and a Radio Base Station (RBS; Node B).

Efficient congestion control is complicated by the fact that the different protocols involved terminate at different locations in the network. This problem situation has been addressed in WO 2010/107348, which takes the position that TCP cannot efficiently resolve a congestion situation in the radio access network (which includes the transport network), because lower layer retransmissions hide the congestion situations from TCP. Instead, WO 2010/107348 introduces an improved HSPA Flow Control (FC) which is performed by a radio base station and which in particular seeks to obtain proportional fair bandwidth sharing among contending traffic flows over the transport network. For this purpose, a relative bit-rate (RBR) weight is assigned to each traffic flow, which will cause the HSPA Flow Control to favor traffic flows having a higher RBR weight over those having a lower RBR weight. The RBR concept allows Quality of Service (QoS) bit-rate differentiation between different types of end-user subscriptions. HSPA Flow Control involves a rate-based congestion control which operates in a Congestion Avoidance (CA) state according to an operating principle known as Additive Increase Multiplicative Decrease (AIMD). In WO 2010/107348, QoS bit-rate differentiation in accordance with the RBR concept is effected by modifying the AI part of the AIMD operating principle.

Some attempts have been made to use the TCP acknowledgement scheme for congestion control purposes in the transport network, despite RLC hiding congestion problems to TCP. If a TCP server receives repeated acknowledgements for previous TCP data but not for the most recently sent TCP data, the congestion control/congestion avoidance functionality in the TCP server will infer this as a congestion condition somewhere on the network and, in response, reduce the bit-rate for the forthcoming transmission by a certain rate. When a network node, such as a radio base station, detects congestion in the transport network, it may signal this to the TCP server by deliberately modifying the contents of current TCP data towards a receiving TCP client in a way such that the TCP client will interpret the received current TCP data as lost or destroyed and therefore discard it. As a result, the TCP client will acknowledge the previous TCP data, once subsequent TCP data has been correctly received. When this has occurred a number of times, the congestion control/congestion avoidance functionality in the TCP server will act to reduce the bit-rate for the forthcoming transmissions in the TCP session in question. Therefore, by causing discarding of TCP data in this way, the radio base station will in effect be capable of performing congestion control by initiating a bit-rate reduction for the TCP session, even though the actual bit-rate reduction is not executed by the radio base station.

A network node in the form of a radio base station will typically handle a plurality of data connections over the transport network, where each data connection (often referred to as Radio Access Bearer, RAB) is adapted to convey data packets travelling between the core side and terminal side of the transport network. Each data connection may handle a varying number of ongoing TCP sessions between one or more TCP servers and a TCP client running in a mobile terminal for a certain end-user. This complicates the congestion control to be performed by the radio base station in the transport network, and the problem is accentuated if the congestion control is to support QoS bit-rate differentiation between different types of end-user subscriptions among the data connections (RAB:s) handled by the radio base station in question. As a result, the actual QoS bit-rate differentiation obtained may deviate from the target QoS bit-rate differentiation as set for instance by the network operator.

Similar problems may occur in other networks or parts thereof, for instance in the air interface between a radio base station and a plurality of mobile terminals.

SUMMARY

It is accordingly an object of the invention to eliminate or alleviate at least some of the problems referred to above.

The present inventor has realized that congestion control with QoS bit-rate differentiation among the data connections handled by a network node can be performed in an enhanced way which allows better compliance with the target QoS bit-rate differentiation as set for instance by the network operator. The present inventor envisages congestion control where the QoS bit-rate differentiation is made adaptive by tracking differences over time between targeted bit-rates and experienced bit-rates for the data connections, and adjusting the targeted bit-rates accordingly when used for the congestion control.

One aspect of the present invention therefore is a method for congestion control in a network node of a communication network, said network node being adapted to handle a plurality of data connections for conveying data between a first side and a second side of said communication network, wherein the congestion control involves associating the data connections with respective target weights for Quality-of-Service (QoS) bit-rate differentiation. The method comprises the steps, in said network node, of obtaining experienced bit-rates for the data connections;
for each data connection:
determining a time integrated difference between the data connection's targeted bit-rate according to its target weight, and its experienced bit-rate; and
calculating an adjusted weight for QoS bit-rate differentiation based on the determined time integrated difference and the target weight; and using the adjusted weights for the congestion control of the data connections.

In one or more embodiments, calculating the adjusted weight $w'_i$ for an individual data connection involves calculating a scaling factor $v_i(t)$ for said individual data connection at a time instant t as:

$$v_i(t) = \max\left(0, v_i(t-1) + p\left(w_i(t)\frac{\sum_{k=1}^{N} r_k(t)}{\sum_{k=1}^{N} w_k(t)} - r_i(t)\right)\right),$$

where p>0 is a settable parameter which determines a trade off between an ability to adapt to environmental changes in said communication network on the one hand, and reduced adaptation accuracy of small continuous variations on the other hand.

In this or these embodiments, the adjusted weight for an individual data connection is then obtained by multiplying the calculated scaling factor $v_i(t)$ by the target weight for said individual data connection.

In one or more embodiments, the congestion control further comprises a congestion controlling action which involves:

detecting a condition indicative of a congestion for any of the data connections;
selecting, among the data connections, a data connection for which a bit-rate reduction is to be caused; and
initiating the reduction of the bit-rate for the selected data connection.

In this or these embodiments, initiating the reduction of the bit-rate for the selected data connection may involve causing discarding of a data packet on said selected data connection.

In this or these embodiments, detecting a condition indicative of a congestion for any of the data connections may involve monitoring sequence numbers associated with incoming data packets, wherein said condition is triggered when the monitored sequence numbers indicate that data has been lost or received out of order.

In this or these embodiments, the data connection for which a bit-rate reduction is to be caused may be selected as the data connection among said data connection which yields the highest value of $r_{k\_avg}/w'_k$, where $w'_k$ is the adjusted weight, and $r_{k\_avg}$ is obtained by:

measuring said experienced bit-rates for the data connections at a plurality of times; and
low pass filtering the measured experienced bit-rates to provide $r_{k\_avg}$.

In this or these embodiments, the network node may be adapted for conveying data packets in compliance with an acknowledgement-based data transmission protocol for delivering a data stream from a sending host to a receiving host, wherein initiating the reduction of the bit-rate by causing discarding of a data packet on said selected data connection involves manipulating said data packet in a way such that the receiving host upon receipt of the data packet will respond to the sending host with an indication that the data packet has not been duly received.

The acknowledgement-based data transmission protocol may be the Transmission Control Protocol, TCP, the sending host may be a TCP server, the receiving host may be a TCP client, and manipulating said data packet may involve causing the TCP client to respond to the TCP server with multiple acknowledgements of one or more data packets received prior to said data packet.

In one or more embodiments, the communication network is a transport network for a radio communication system, the network node is a radio base station, the plurality of data connections are radio access bearers, and the data packets are conveyed in the payload of protocol data units (PDU) in HS-DSCH data frames.

In one or more alternative embodiments, the communication network is a transport network for a radio communication system, wherein the congestion control involves an Additive Increase Multiplicative Decrease (AIMD) operating principle, and wherein using the adjusted weights for the congestion control of the data connections involves modifying Additive Increase operations of said AIMD operating principle based on the adjusted weights.

In still one or more alternative embodiments, the data connections are radio links to mobile terminals over an air interface in a radio communication system, wherein the network node is a radio base station having an air interface scheduler, and wherein the congestion control involves scheduling of downlink data to be transmitted to said mobile terminals in accordance with said calculated adjusted weights.

A second aspect of the invention is a computer program product comprising computer program code means for executing the method according to the first aspect when said computer program code means are run by a programmable controller of the network node.

A third aspect of the invention is a computer readable medium having stored thereon a computer program comprising computer program code means for executing the method according to the first aspect when said computer program code means are run by a programmable controller of the network node.

A fourth aspect of the invention is a network node for a communication network, wherein said network node is adapted to handle a plurality of data connections for conveying data between a first side and a second side of said communication network, said network node comprising:

a relative bit-rate manager for providing proportional-fair-share congestion control which involves associating the data connections with respective target weights for Quality-of-Service (QoS) bit-rate differentiation; and an integrating controller configured for:
obtaining experienced bit-rates for the data connections;
for each data connection:
determining a time integrated difference between the data connection's targeted bit-rate according to its target weight, and its experienced bit-rate; and
calculating an adjusted weight for QoS bit-rate differentiation based on the determined time integrated difference and the target weight; and
providing the adjusted weights to the relative bit-rate manager.

The network node may be further configured to perform the steps of the method as defined above for the first aspect.

It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Objects, features and advantages of embodiments of the invention will appear from the following detailed description, reference being made to the accompanying drawings.

DETAILED DESCRIPTION

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Before turning to a detailed description of the disclosed embodiments, an exemplifying environment in which they may be exercised will now be briefly described with reference to FIG. 1.

Figure 1:
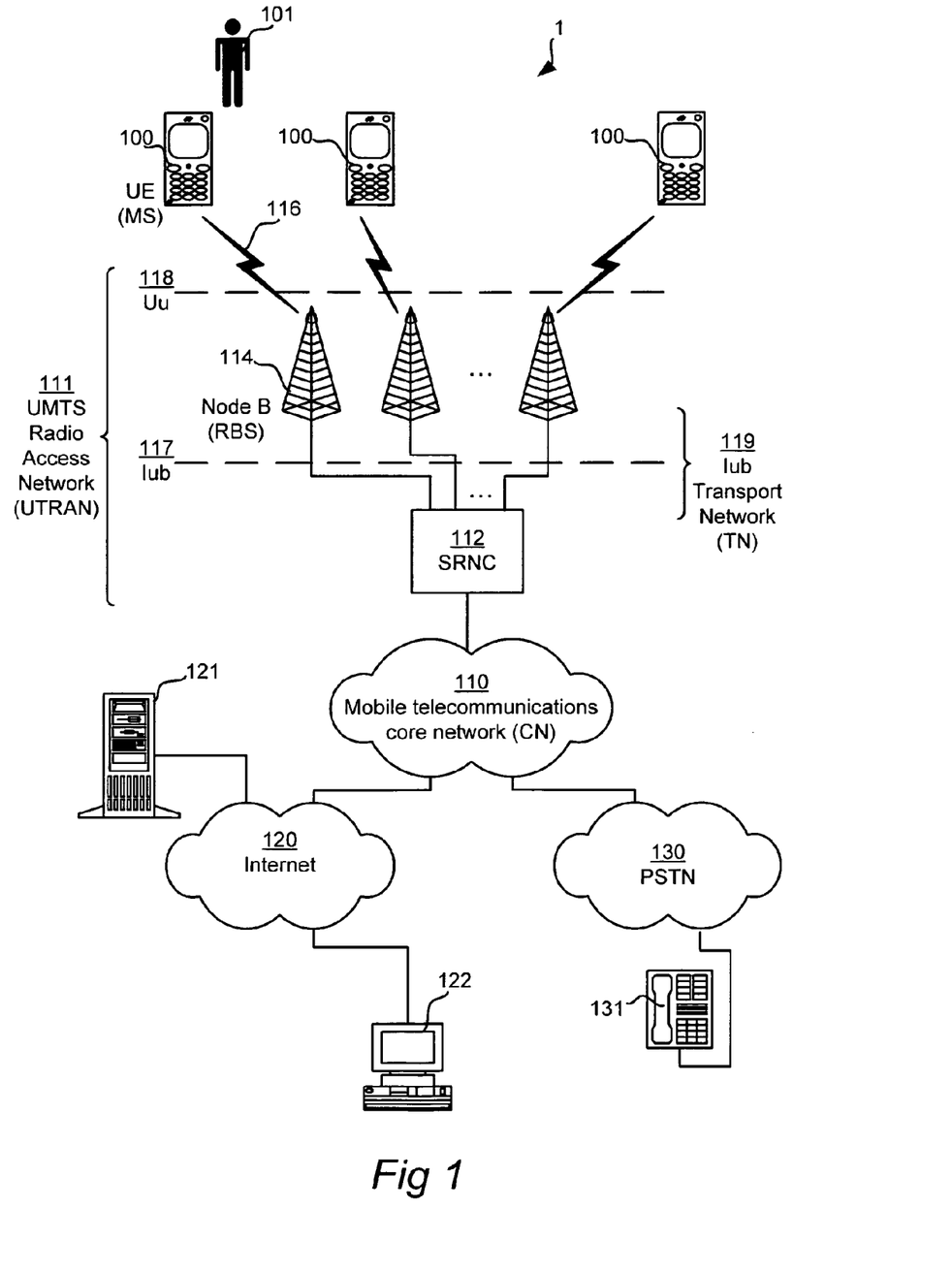
FIG. 1 is a schematic illustration of a non-limiting example of a telecommunication system in which embodiments of the present invention may be exercised.

FIG. 1 illustrates a cellular telecommunications system 1 according to the familiar 3G/UMTS system architecture, as defined in the 3GPP specifications. Users 101 of user equipment (UE) 100 (i.e. mobile terminals) may use different telecommunications services, such as voice calls, Internet browsing, video calls, data calls, facsimile transmissions, still image transmissions, video transmissions, electronic messaging, and e-commerce. An individual UE 100 connects to a mobile telecommunications core network 110 over a radio link 116 to a radio base station (RBS) 114 (also known as Node B), which in turn is connected to a serving radio network controller (SRNC) 112. A transport network (TN) 119, also known as Iub 117, is provided between the SRNC 112 and RBS 114, and an air interface 118, also known as Uu, is provided between RBS 114 and UE 100. SRNC 112, TN 119 and RBS 114 thus constitute a UMTS Radio Access Network (UTRAN) 111.

It is to be noticed that the situation in FIG. 1 has been kept on a general level in order not to obscure the disclosure in unnecessary detail. As is well known to the skilled person, there are other elements in a real 3G/UMTS system, not shown in FIG. 1. For instance, in some situations where a connected individual UE 100 is handed over to another cell, a Drift Radio Network Controller (DRNC) may act as a switch to route information between the SRNC and the UE.

A conventional public switched telephone network (PSTN) 130 may be connected to the mobile telecommunications core network 110. Various telephone terminals, including a stationary telephone 131, may connect to the PSTN 130. The mobile telecommunications core network 110 is also typically associated with a wide area data network 120, such as the Internet. Server computers 121 and client computers 122 may be connected to the wide area data network 120 and therefore allow communication of packet data with the UE 100. Such packet-based communication may for instance be in accordance with the HSPA protocol set, including HSDPA for downlink communication and EUL (i.e. HSUPA) for uplink communication. For details about these protocols, reference is made to the 3GPP specifications, which may be found for instance at http://www.3gpp.com/.

A common situation in the telecommunications system 1 will be the transfer of data from a sender, such as one of the server computers 121, to a receiver, such as one of the UE:s 100. Such data transfer may typically occur in accordance with the TCP protocol. Thus, as seen in FIG. 5, a TCP server application 500 will set up a TCP session with a TCP client application 520 which runs in the UE 100. The data to be transferred may be divided into data packets, such as IP packets, by the TCP server application 500 and then sent in TCP segments to the TCP client application 520. Of course, the mobile telecommunications core network 110 and the radio access network 111, including the transport network 119, will be involved in this transfer of data packets. In addition to TCP, many other protocols will be involved during the conveyance of the data packets, as is readily understood by the skilled person. For instance, the protocol situation from the point of view of a radio base station 510 in the transport network is shown in a simplified manner in FIG. 4.

Figure 4:
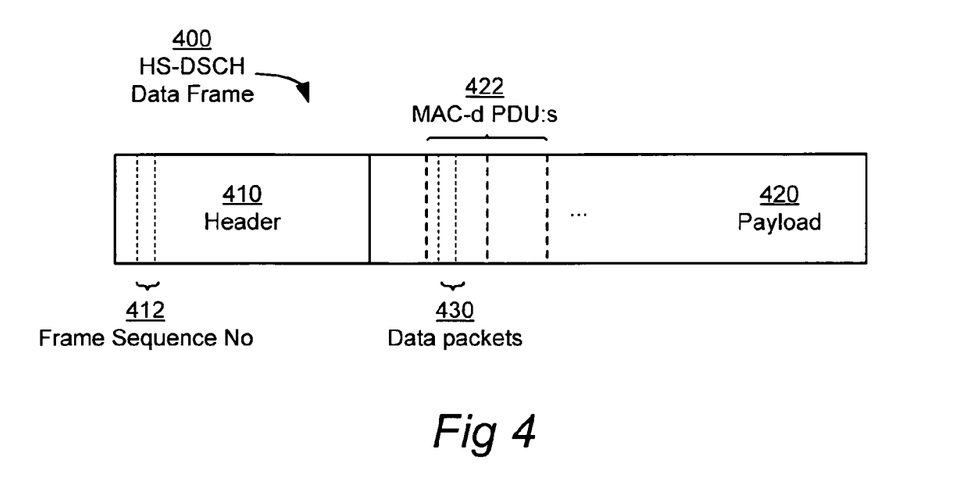
FIG. 4 schematically illustrates a HS-DSCH data frame.
Figure 5:
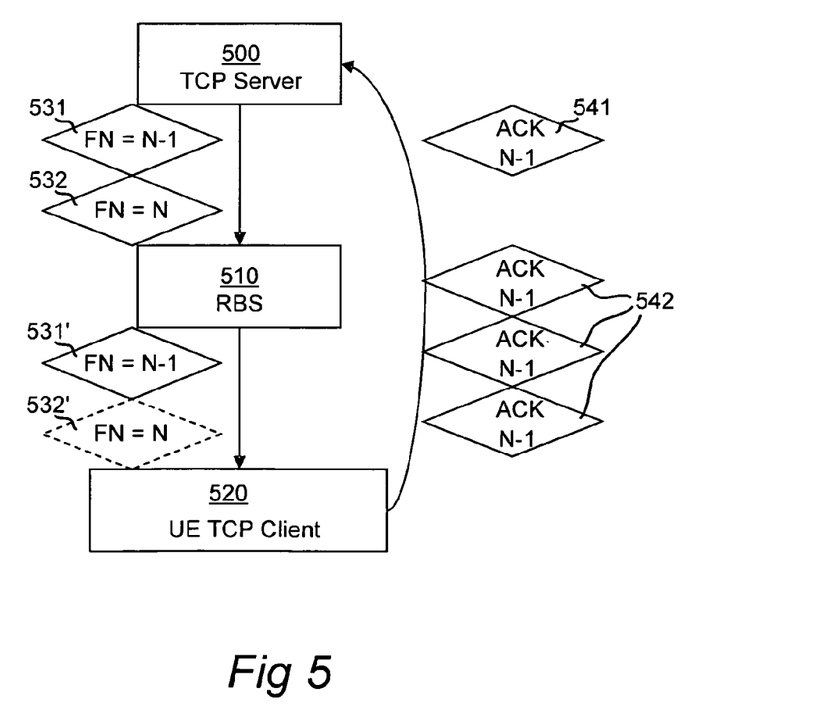
FIG. 5 schematically illustrates an approach to cause a bit-rate reduction for congestion control purposes by way of deliberately causing a data packet to be discarded to trigger an inherent congestion avoidance mechanism of an upper-level TCP protocol.

As seen in FIG. 4, the data packets 430 that originated from the TCP server application 500 will be handled in the radio base station 510 in the form of HS-DSCH data frames 400. Each HS-DSCH data frame 400 comprises a header 410 and a payload 420. The header includes a frame sequence number 412 and also specifies the contents of the payload 420. The payload 420 will contain a number of MAC-d portable data units (PDU) 422, in which the data packets 430 are encapsulated.

As is well known, the TCP protocol is an acknowledgement-based data transmission protocol where the TCP server application 500 will expect an acknowledgement from the TCP client application 520 for a certain TCP segment. In FIG.

5, the TCP client application 520 issues at 541 an acknowledgement "ACK N−1" in response to successful receipt of a TCP segment "FN=N−1" having a certain frame number or sequence number N−1 (see 531). If such an acknowledgment is not issued, the TCP server application 500 will act to retransmit the TCP segment in question.

The TCP acknowledgement scheme also serves a role in congestion control or congestion avoidance. For instance, in case the TCP server application 500 receives repeated acknowledgements "ACK N−1" (see 542) for the previous TCP segment "FN=N−1" but not for the most recently sent TCP segment "FN=N" (see 532), the congestion control/ congestion avoidance functionality in the TCP server application 500 will infer this as a congestion condition somewhere on the network and, in response, reduce the bit-rate for the forthcoming transmission by a certain rate, such as for instance a 50% bit-rate reduction.

In some embodiments of the invention, the radio base station 510 will use this inherent property of the TCP protocol when performing congestion control in the radio base station 510, even though the TCP protocol is not terminated therein. Continuing with the example shown in FIG. 5, the radio base station 510 will handle the previous TCP segment "FN=N−1" in the normal manner by forwarding the MAC-d PDU 422 that contains the TCP segment "FN=N−1" and its data packets 430 over the air interface to the TCP client application 520. This will, as described above, cause the TCP client application 520 to issue the acknowledge "ACK N−1", as seen at 541.

When the radio base station 510 detects a condition in the transport network which indicates a congestion, it may signal this to the TCP server application 500 by deliberately modifying the contents of the MAC-d PDU 422 in a way such that the TCP client application 520 will interpret the received TCP segment "FN=N" as lost or destroyed and therefore discard it. As a result of having discarded the received TCP segment "FN=N", the TCP client application 520 will issue an acknowledgement "ACK N−1" for the previous TCP segment "FN=N−1", once a subsequent TCP segment is correctly received. When three such subsequent TCP segments "FN=N+1", "FN=N+2" and "FN=N+3" (not shown in FIG. 5) have been correctly received and caused the TCP client application 520 to respond three times with an acknowledgement "ACK N−1" for the previous TCP segment "FN=N−1", the congestion control/-congestion avoidance functionality in the TCP server application 500 will act upon such multiple consecutive acknowledgements "ACK N−1" by reducing the bit-rate for the forthcoming transmissions in the TCP session.

Therefore, by causing the TCP segment "FN=N" to be discarded in this way, the radio base station 510 will in effect be capable of performing congestion control by initiating a bit-rate reduction for the TCP session, even though the actual bit-rate reduction is not executed by the radio base station 510.

Figure 8:
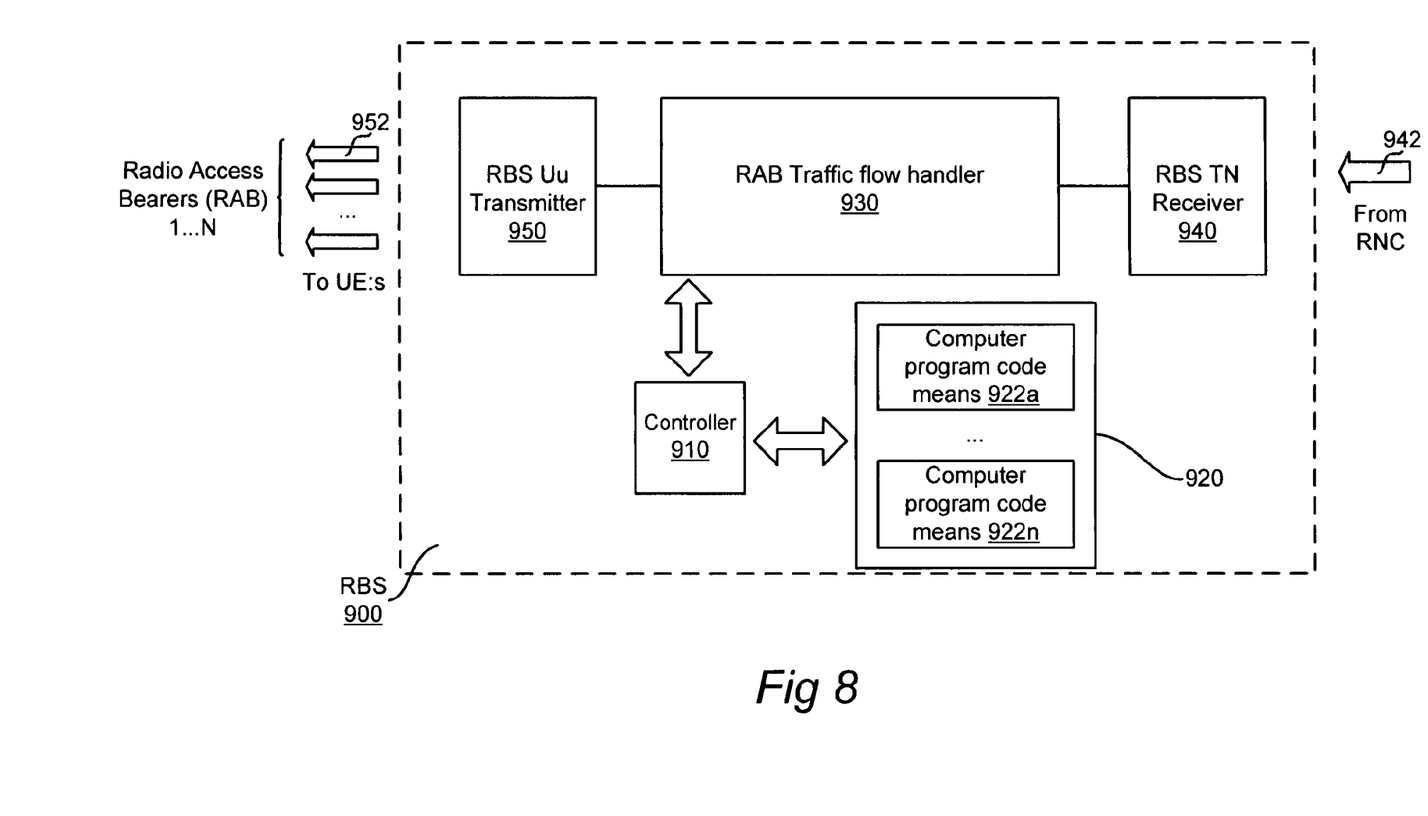
FIG. 8 illustrates some key elements of a network node in the form of a radio base station in which embodiments of the present invention may be implemented.

The situation above has been kept on a simple level, involving just a single TCP session. However, in reality, a radio base station 114 in a transport network 119 will be responsible for handling a large number of concurrent TCP sessions between various TCP servers and TCP clients in different UE:s 100. Reference is now made to FIG. 8 which illustrates some key elements of a radio base station 900 (e.g. 114 in FIG. 1) for handling downlink packet data 942 as received from a radio network controller (e.g. SRNC 114 in FIG. 1). An RBS transport network (TN) receiver 940 acts to receive the downlink packet data 942 from the radio network controller. A radio access bearer (RAB) traffic flow handler 930 will take care of the received data 942 and handle it appropriately so that it can be transmitted further on towards the respective UE.s 100 via an RBS Uu transmitter 950 over a plurality of data connections or RAB:s 952 on the air interface Uu (cf 118 in FIG. 1). Each data connection or RAB 952 may contain one or a plurality of TCP sessions destined to a particular UE 100, and the number of TCP sessions carried by each such data connection or RAB 952 will vary from time to time.

The radio base station 900 also has a programmable controller 910 and associated memory or data storage 920. The controller 910 may be implemented by at least one central processing unit (CPU), digital signal processor (DSP) or other programmable electronic logic device such as an application-specific integrated circuit (ASIC) or field-programmable gate array (FPGA), or any combination thereof. The memory 920 may contain work memory and storage memory, and may for instance be implemented in the form of RAM, EEPROM, flash memory (e.g. memory card), magnetic hard disk, or any combination thereof. The memory 920 is capable of storing program code means 922a-922n which is executable by the controller 910. Therefore, all or some of the functionality of the RAB traffic flow handler 930 may be performed by the controller 910 being suitably programmed in the form of the program code means 922a-922n.

Figure 3:
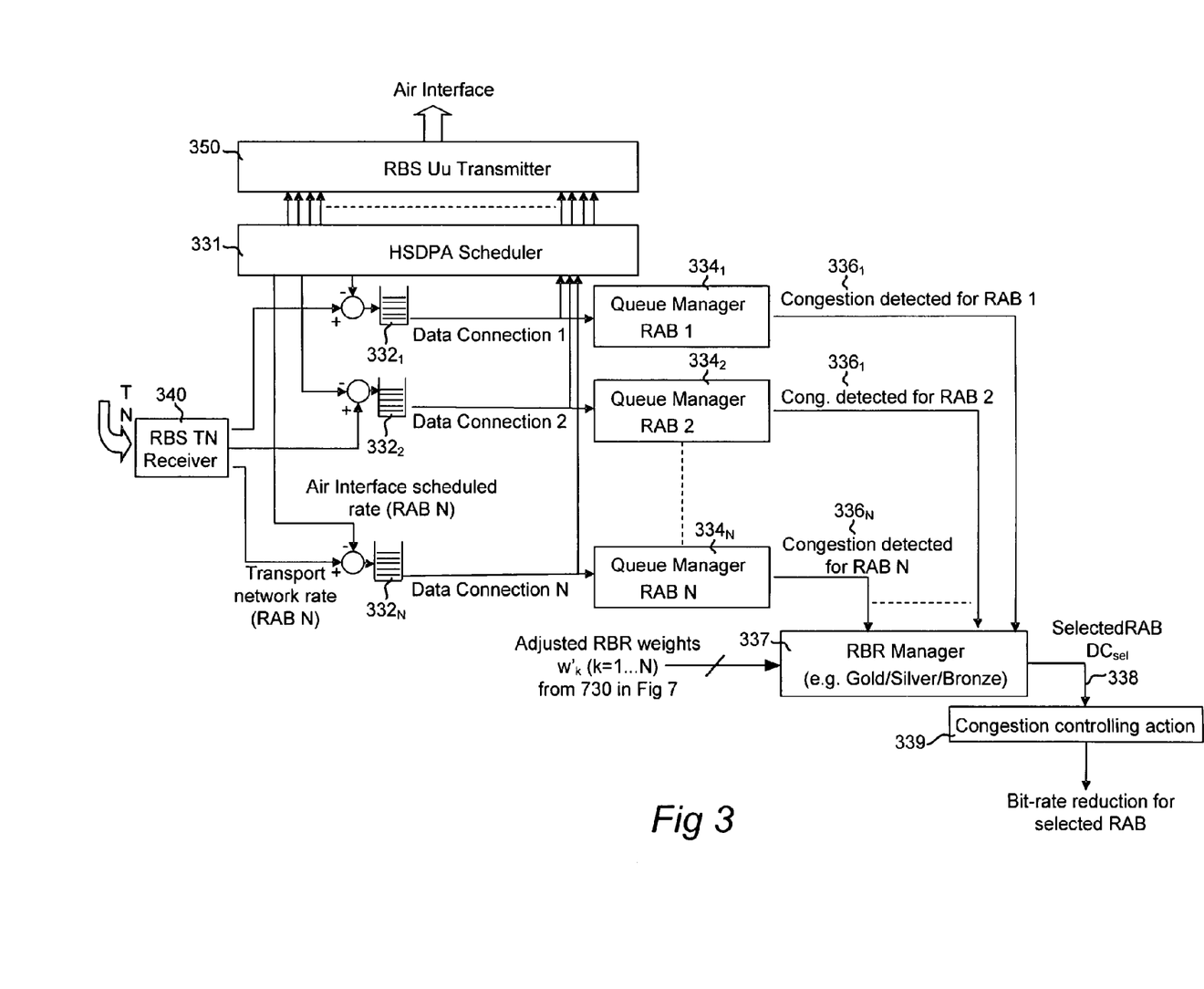
FIG. 3 is a schematic block diagram of HSDPA queue manager functionality in a radio base station in which embodiments of the present invention may be implemented.

An important task for the RAB traffic flow handler 930 is the scheduling of outgoing data traffic. As seen in FIG. 3, HSDPA queue manager functionality is included in the RAB traffic flow handler 930. An HSDPA scheduler 331 is assisted by a plurality of queue managers $334_1$-$334_N$, managing respective queues $332_1$-$332_N$. Each queue contains data destined for a respective one of the data connections 952 (RAB 1-RAB N) in the form of MAC-d PDU:s 422 (see FIG. 4) which have been conveyed to the radio base station 900 at 942 in incoming HS-DSCH data frames 400 (FIG. 4) from the core side of the network 1 (i.e. the SRNC 112).

Another important task for the RAB traffic flow handler 930 is congestion control. For the disclosure of the present embodiment, congestion control refers to a transport network-limited scenario rather than an air interface-limited scenario. However, in its broadest sense the invention is applicable to various kinds of networks and is not limited to any particular type, standard, configuration, media or environment. Now, therefore, with reference to FIGS. 2, 6 and 7 follows a general description of network congestion control with adaptive QoS bit-rate differentiation, applicable to various embodiments of the invention. Then, there will follow a detailed description of how this can be applied to the specific embodiments represented by FIGS. 3-5 and 8.

Figure 7:
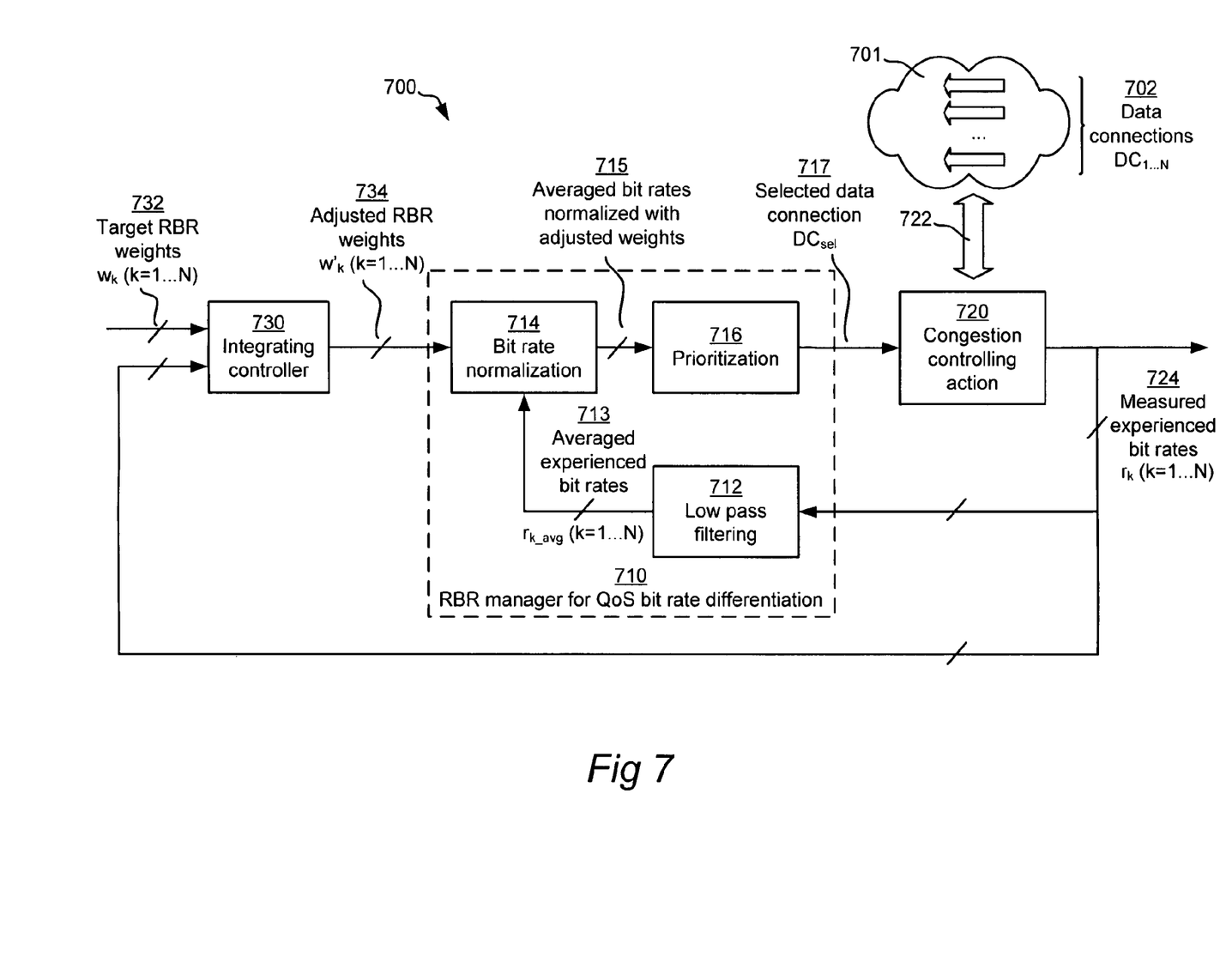
FIG. 7 illustrates an arrangement for congestion control according to an embodiment of the invention.

FIG. 7 discloses a network node 700 for a communication network 701, which may or may not be the radio base station 900 and the telecommunications system 1 as referred to above. The network node 700 is adapted to handle a plurality of data connections $DC_{1-N}$ 702 for conveying data between a first side and a second side of the communication network 701. For the purpose of congestion control among the data connections $DC_{1-N}$, there is provided a manager 710 for Quality-of-Service (QoS) bit-rate differentiation in accordance with a concept which is referred to as RBR (relative bit-rate). This concept is illustrated in FIG. 2 and will now be briefly explained.

Figure 2:
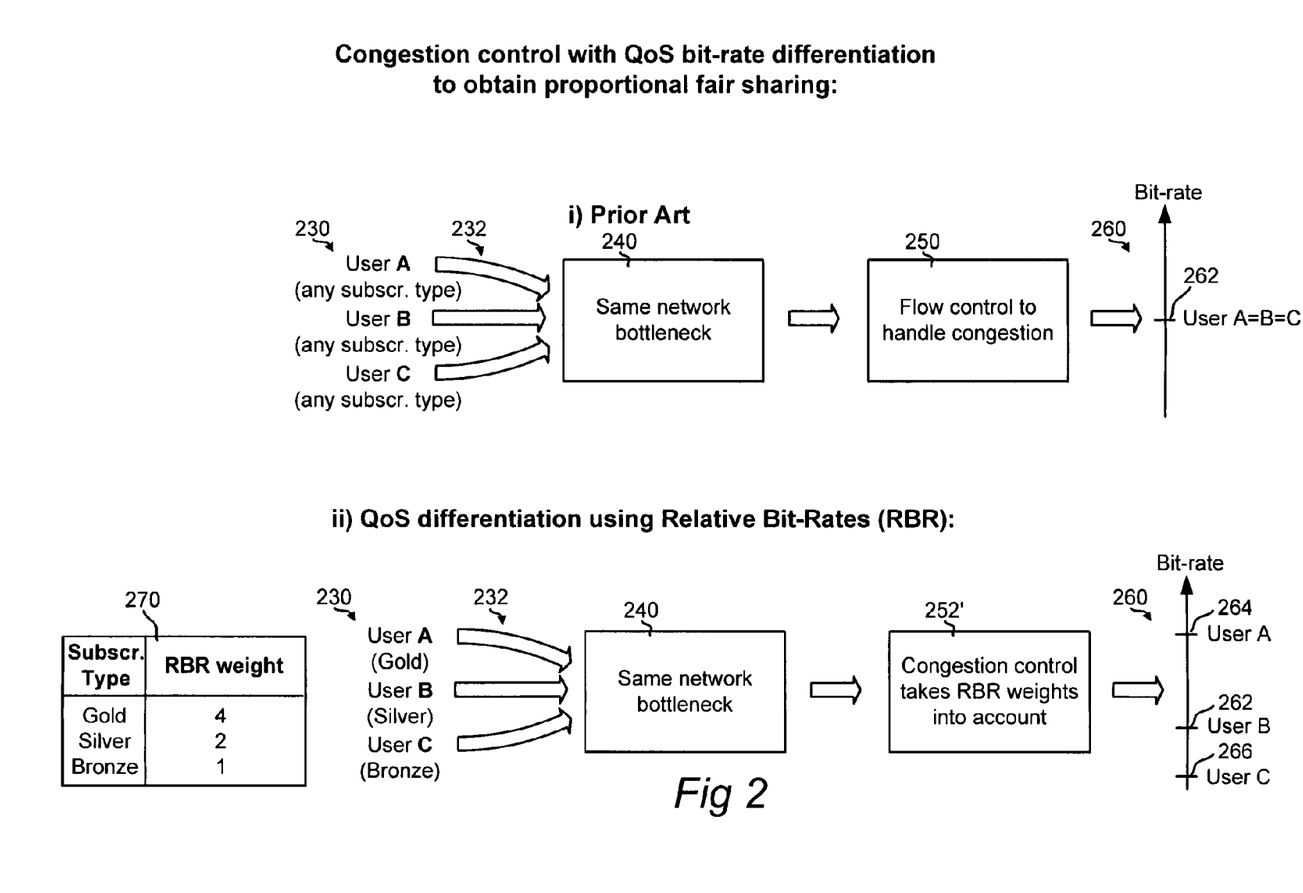
FIG. 2 illustrates congestion control with QoS bit-rate differentiation to obtain proportional fair sharing.

As seen in FIG. 2, introducing the concept of relative bit-rate provides a kind of Quality of Service profiling, where prioritized users may be favored over less prioritized users when it comes to sharing the available bandwidth when contending traffic flows (data connections 952/RAB 1-N/$DC_{1-N}$) of the users share the same transport network bottleneck. The relative bit-rate, RBR concept may be used to obtain proportional fair bandwidth sharing among contending traffic flows subjected to the same transport network bottleneck. The effect of the RBR concept is illustrated at ii) in FIG. 2, whereas the corresponding (traditional) situation when the RBR concept is not applied is illustrated at i) in FIG. 2.

Starting with i) at 230 in FIG. 2, a number of users A, B, C receive traffic flows 232 which are subjected to the same network bottleneck 240. When the network is a transport network in a 3G system like the one shown in FIG. 1, such contending traffic flows 232 will have the same TN QoS differentiation class and traverse the same path in the transport network 119. Conventional flow control 250, such as HSPA flow control, will treat all contending traffic flows 232 equally (albeit individually). In the case of HSPA flow control, this means subjecting each flow to additive increase operations with the same amount of bit-rate increase as for the other flows, until congestion occurs, wherein multiplicative decrease operations instead are performed as appropriate.

Therefore, as a result of the flow control 250, for the given bottleneck 240, all users A, B, C will—after some iterations of the flow control—arrive at about the same bit-rate 262, as seen at 260—i.e. a fair bandwidth sharing. This will happen even though the users A, B, C may have different priorities in the mind of the network operator, such as subscriptions with different levels of importance (e.g. differentiated by different subscription fees), since the traffic flows 232 are all treated the same (e.g. communicated within the same TN QoS differentiation class).

By introducing the concept of RBR, as seen at ii) in FIG. 2, proportional fair bandwidth sharing may ideally be provided for the traffic flows 232 of the users A, B, C. Here, it is assumed that the user A has a subscription of type Gold, which is more prioritized than the subscription type Silver of user B, which in turn is more prioritized than the subscription type Bronze of user C. Each subscription type is assigned a respective RBR weight, as seen at 270. The assignment of RBR weight is typically done by the network operator. Therefore, when congestion occurs for the traffic flows 232 of users A-C because of the common bottleneck 240, the traffic flow for user A will have a higher RBR weight (e.g. 4), than the traffic flow for user B (e.g. 2), whereas the traffic flow for user C will have a lower RBR weight (e.g. nominal, 1). The congestion control 250' is adapted to take the respective RBR weight of each traffic flow into account, such that traffic flows with a higher RBR weight (e.g. the flow of user A) will be favored over those with a lower RBR weight (e.g. the flow of user B or C).

As a result, proportional-fair bandwidth sharing among the contending traffic flows may ideally be obtained. This means that each flow will get a bit-rate which differs relative to the nominal bit-rate (i.e. the bit-rate that would have been obtained by the traditional fair bandwidth sharing scheme) to an extent which corresponds to the relative difference in RBR. In other words, the bit-rate 264 given to user A compared to the bit-rate 262 offered to user B will approach a difference of a factor 4/2=2, reflecting the difference in RBR between subscription types Gold and Silver. Correspondingly, the nominal bit-rate 266 given to user C compared to the bit-rate 262 offered to user B will approach a difference of a factor ½=0.5 corresponding to the difference in RBR between subscription types Bronze and Silver. The difference between users A and C will be a factor 4/1=4.

Referring back to FIG. 7, the RBR manager 710 operates according to the RBR concept described above. The RBR manager 710 will receive experienced bit-rates $r_k$, k=1-N, as measured at 724 for the data connections $DC_{1-N}$, in a low pass filtering block 712. The low pass filtering block 712 supplies averaged experienced bit-rates $r_{k\_avg}$ at 713 to a bit-rate normalization module 714. The bit-rate normalization module 714 accepts RBR weights for the data connections $DC_{1-N}$ as input at 734, and supplies averaged bit-rates normalized with the RBR weights as output at 715. A prioritization block 716 receives this output 715 as input and determines a selected data connection $DC_{sel}$ among the data connections $DC_{1-N}$ at 717. A congestion controlling action block 720 is responsible for initiating or causing an appropriate bit-rate reduction for the selected data connection $DC_{sel}$, as seen at 722.

However, because of the inherently unpredictable nature of TCP sessions in terms of duration, unexpected user behavior, files transfer sizes, etc, and because each data connection may handle a varying number of ongoing TCP sessions, the actual differences in the obtained bit-rates will not always approach the ideal differences as represented by the target RBR weights set by e.g. the network operator. To this end, the network node 700 is provided with an integrating controller 730. The integrating controller 730 will serve as an outer loop for the QoS bit-rate differentiation-based congestion control provided by the RBR manager 710 and act to adjust the RBR weights provided as input to the RBR manager 710 based on time integrated differences between targeted bit-rates, as determined by the target weights $w_k$ set e.g. by the network operator, and experienced bit-rates $r_k$.

Figure 6:
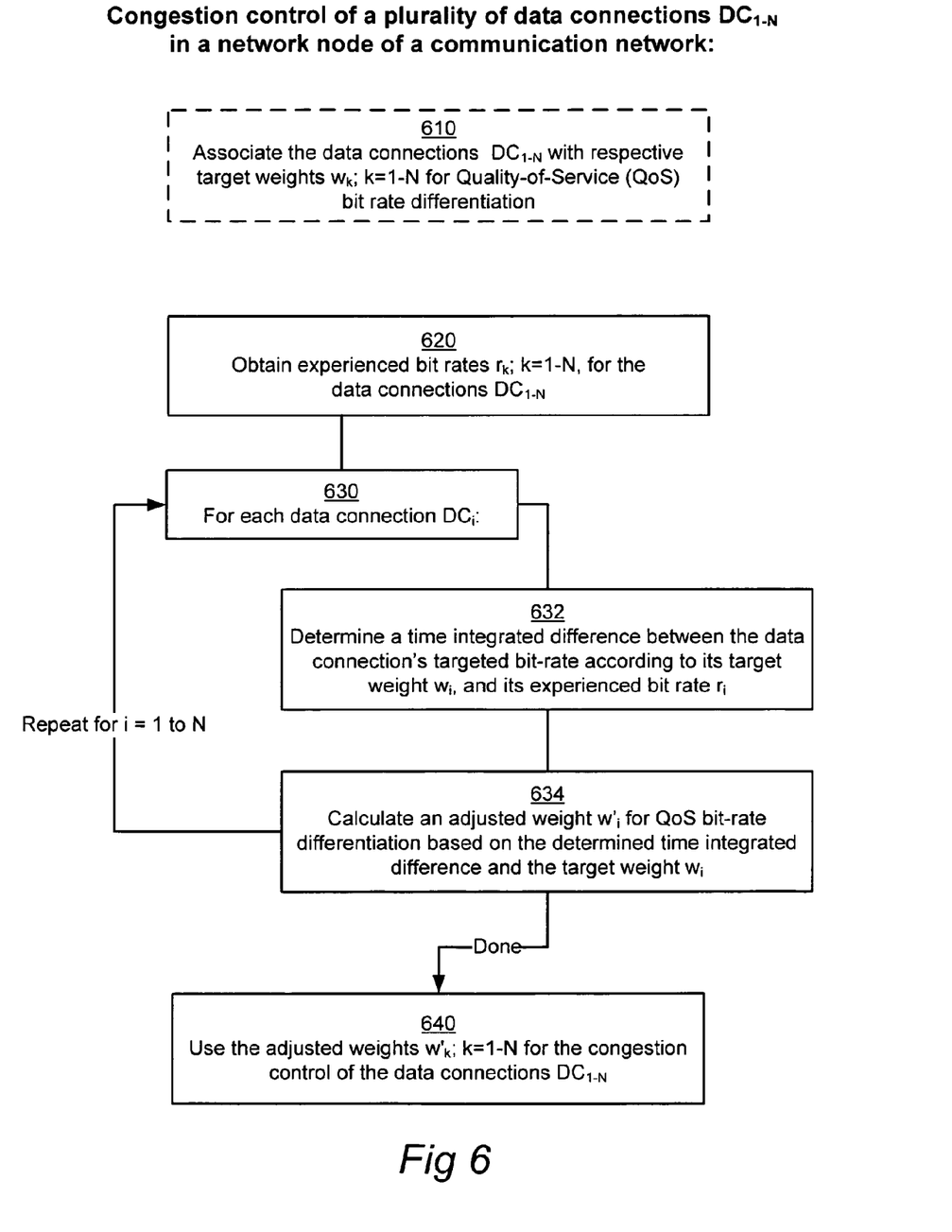
FIG. 6 is a schematic flowchart diagram to illustrate the inventive concept.

The role of the integrating controller 730 is explained in more detail in the flowchart shown in FIG. 6. In a first step 620, experienced bit-rates $r_k$; k=1-N are obtained for the data connections $DC_{1-N}$ and received by the integrating controller 730. Then, a loop 630 is executed for each data connection $DC_i$. In a step 632 of this loop, a time integrated difference is determined between the data connection's targeted bit-rate according to its target RBR weight $w_i$, and its experienced bit-rate $r_i$. Then, in a following step 634, an adjusted RBR weight $w'_i$ for QoS bit-rate differentiation is calculated based on the determined time integrated difference and the target RBR weight $w_i$. The adjusted RBR weights $w'_k$; k=1-N are then used, see 640, for the congestion control of the data connections by the RBR manager 710, as seen at 734 in FIG. 7.

In the disclosed embodiment, the step 634 for calculating the adjusted weight $w'_i$ for the individual data connection $DC_i$ involves calculating a scaling factor $v_i(t)$ for the individual data connection at a time instant t as:

$$v_i(t) = \max\left(0, v_i(t-1) + p\left(w_i(t)\frac{\sum_{k=1}^{N} r_k(t)}{\sum_{k=1}^{N} w_k(t)} - r_i(t)\right)\right),$$

where p>0 is a settable parameter which determines a trade off between an ability to adapt to environmental changes in the communication network 700 on the one hand, and reduced adaptation accuracy of small continuous variations on the other hand.

The calculated scaling factor $v_i(t)$ is then multiplied by the target RBR weight $w_i$ to obtain the adjusted RBR weight $w'_i$ for the individual data connection $DC_i$.

The adjusted RBR weights $w'_k$; k=1-N may be used in different ways, depending on how the RBR manager 710 is implemented. For instance, one alternative embodiment uses rate-based congestion control which involves an Additive Increase Multiplicative Decrease (AIMD) operating principle for contending traffic flows in a transport network, like 119 in FIG. 1. In similarity with the document WO 2010/107348 which was mentioned in the Background section, QoS bit-rate differentiation-based congestion control is obtained in this alternative embodiment by modifying Additive Increase operations of the AIMD operating principle based on the adjusted RBR weights w'$_k$.

In the disclosed embodiment, the RBR manager 710 is implemented by the RAB traffic flow handler 930 of the radio base station 900 of FIG. 8. The RAB traffic flow handler 930 is shown in more detail in FIG. 3. Therefore, reference is now made to FIG. 3.

Each queue manager 334$_1$-334$_N$ is responsible for detecting a condition which is indicative of a congestion for its data connection 952 (i.e., RAB i for queue manager 334$_i$, where i=1 ... N). This may involve monitoring the sequence numbers 412 of the received incoming HS-DSCH data frames 400 from the core side of the network 1 (i.e. the SRNC 112), wherein the congestion-indicative condition is triggered when the monitored sequence numbers indicate that data has been lost or received out of order. Alternatively, congestion may be detected in other ways. One way is to examine the contents of the MAC-d PDU:s 422 to determine that the data packets 430 contained therein have been corrupted. Another way is to detect that a target buffer length or dwell time for the queue 132$_i$ has been exceeded. Still another way is to detect a processing delay or memory overflow.

When an individual queue manager 334$_i$ has detected congestion, it will indicate this by issuing a message 336$_i$. In one embodiment, the data connection 952 (RAB i) for which the message 336$_i$ was issued is also selected (cf the prioritization block 716 in FIG. 7) as the data connection DC$_{sel}$ for which a congestion controlling action 339 (cf 720 in FIG. 7) is to be taken. In other, more advanced embodiments, the selection takes due account of the RBR weights of the data connections 952. To this end, when the RBR manager 337 receives a message 336$_i$ from any queue manager 334$_i$ that congestion has been detected for its data connection RAB i, the RBR manager 337 will determine which data connection DC$_{sel}$ to take the congestion controlling action 339 for in the following way. The experienced bit-rates r$_k$; k=1-N for the data connections RAB 1-N (DC$_{1-N}$) will be measured at a plurality of times (cf 724 in FIG. 7), and low pass filtered (cf 712 in FIG. 7) to provide averaged experienced bit-rates r$_{k\_avg}$ (cf 713 in FIG. 7). The data connection DC$_{sel}$ for which the congestion controlling action 339 is to be taken is then selected as the data connection which yields the highest value of r$_{k\_avg}$/w'$_k$, where w'$_k$ is the adjusted RBR weight for the data connection RAB k (DC$_k$).

The congestion controlling action 339 (cf 720 in FIG. 7) is then taken for the selected data connection DC$_{sel}$. In the disclosed embodiment, the congestion controlling action 339 involves initiating a reduction of the bit-rate for the selected data connection DC$_{sel}$. More specifically, the reduction of the bit-rate is initiated by deliberately causing discarding of a data packet on the selected data connection. As has already been briefly described above with reference to FIG. 5, this may be done by manipulating a data packet in a way such that the receiving host (e.g. TCP client 520 in FIG. 5) upon receipt of the data packet will respond to the sending host (e.g. TCP server 500 in FIG. 5) with an indication that the data packet has not been duly received.

Thus, packet manipulation functionality in the congestion controlling action module 339 in FIG. 3 will deliberately modify the contents of the outgoing data (e.g. HS-DSCH Data Frame 400 in FIG. 4) in a way such that the TCP client 520 in the receiving UE 100 will interpret the received packet as lost or destroyed and therefore discard it. Such deliberate modification may for instance involve modifying one or more bits of one or more of the data packets 430 comprised in the MAC-d PDU 422, substituting some part of or the entire data packet(s) 430, changing a checksum of the HS-DSCH Data Frame 400 or any data carried therein, or basically manipulating the outgoing data in any conceivable way which causes the TCP error correction/detection functionality in the TCP client 520 to regard the received data packet(s) as lost or corrupt and therefore respond to the TCP server 500 with multiple acknowledgements of previously received data packet(s), thus indicating data congestion.

In a refined embodiment the situation towards proportional fair band-width sharing is further improved by causing discarding of a plurality of data packets and configuring the packet manipulation functionality in the module 339 to deliberately distribute the packets to be discarded among different TCP sessions currently run by the determined data connection DC$_{sel}$. To this end, the packet manipulation functionality in the module 339 will be provided with data decoding and analysis functionality in order to examine the individual packets in the data stream on the data connection DC$_{sel}$ and determine the respective TCP sessions to which they belong.

The invention has been described above in detail with reference to embodiments thereof. However, as is readily understood by those skilled in the art, other embodiments are equally possible within the scope of the present invention, as defined by the appended claims.

For instance, in one alternative, the invention is applied to the air interface scheduler of a radio base station (such as the aforementioned radio base station 114; 900) to provide improved congestion control in the air interface between the radio base station and a plurality of mobile terminals (e.g. the aforementioned UE:s 100). Thus, in this embodiment, the data connections DC$_{1-N}$; RAB 1-N are radio links 116; 952 to the mobile terminals 100 over the air interface 118 in the radio communication system 1. The air interface scheduler 331 (FIG. 3) of the radio base station 114; 900 exercises congestion control by scheduling or prioritizing among the downlink data to be transmitted to the different mobile terminals 100. Thus, the air interface scheduler 331 sorts the data connections into an order in which the downlink data will be transmitted.

A Proportional Fair (PF) scheme is used for this scheduling to provide QoS bit-rate differentiation. To this end, in similarity with the embodiments described above, the data connections DC$_{1-N}$ are assigned respective target weights for QoS bit-rate differentiation. The PF scheduling scheme operates to sort the data connections based on both the momentary radio conditions and the bit-rates of the data connections as measured or determined on RLC level. More specifically, the PF scheduling scheme is

[QoS$_{weight}$/F(rate)]*CQI, where CQI is the Channel Quality Indicator sent from the respective UE to the scheduler (CQI being higher with better channel), F(rate) is the filtered bit-rate (either measured or some other bit-rate-related quantity) for the respective data connection, and QoS$_{weight}$ is the respective data connection's target weight for QoS bit-rate differentiation (corresponding to w$_k$ in the previous description).

In this basic form, a UE with better average CQI will get a higher bit-rate than a UE with lower average CQI, even if they have the same QoS$_{weight}$. Therefore, a division with the UE's average CQI, F(CQI), is preferably made:

[QoS$_{weight}$/F(rate)]*[CQI/F(CQI)].

QoS$_{weight}$/F(rate)*CQI/F(CQI).

Still, there may be a small error in the achieved relative bit-rates even in a static scenario (because of some choices in the CQI implementation). This small error can be corrected by determining a time integrated difference between the data connection's targeted bit-rate according to its target weight $QoS_{weight}$, and its experienced bit-rate, then calculating an adjusted weight $QoS_{weight}'$ for QoS bit-rate differentiation based on the determined time integrated difference and the target weight $QoS_{weight}$, and using the adjusted weight $QoS_{weight}'$ in the PF scheduling scheme above.

It shall further be noticed that the invention is applicable also to other networks than 3G/UMTS, including but not limited to LTE. Thus, in an alternative embodiment, the congestion control functionalities which have been described above for the RBS (Node B) 114; 510; 900 are instead implemented in an LTE radio base station which is commonly referred to as eNodeB.

The invention claimed is:

1. A method for congestion control in a network node of a communication network, said network node being adapted to handle a plurality of data connections for conveying data between a first side and a second side of said communication network, wherein the congestion control involves associating the data connections with respective target weights for Quality-of-Service (QoS) bit-rate differentiation, the method comprising the steps, in said network node, of:
    obtaining experienced bit-rates for the data connections;
    for each data connection:
        determining a time integrated difference between the data connection's targeted bit-rate according to its target weight, and its experienced bit-rate; and
        calculating an adjusted weight for QoS bit-rate differentiation based on the determined time integrated difference and the target weight; and
    using the adjusted weights for the congestion control of the data connections;
    wherein calculating the adjusted weight for an individual data connection involves calculating a scaling factor $v_i(t)$ for said individual data connection at a time instant t as:

$$v_i(t) = \max\left\{0, v_i(t-1) + p\left(w_i(t)\frac{\sum_{k=1}^{N} r_k(t)}{\sum_{k=1}^{N} w_k(t)} - r_i(t)\right)\right\},$$

where p>0 is a settable parameter which determines a tradeoff between an ability to adapt to environmental changes in said communication network on the one hand, and reduced adaptation accuracy of small continuous variations on the other hand, where $r_k(t)$ is the experienced bit rate, and where $w_i(t)$ is the target for the individual data connection.

2. The method according to claim 1, wherein the adjusted weight for an individual data connection is obtained by multiplying the calculated scaling factor $v_i(t)$ by the target weight for said individual data connection.

3. The method according to claim 1, wherein the congestion control further comprises a congestion controlling action which involves:
    detecting a condition indicative of a congestion for any of the data connections; selecting, among the data connections, a data connection for which a bit-rate reduction is to be caused; and
    initiating the reduction of the bit-rate for the selected data connection.

4. The method according to claim 3, wherein initiating the reduction of the bit-rate for the selected data connection involves causing discarding of a data packet on said selected data connection.

5. The method according to claim 4, wherein the communication network is a transport network for a radio communication system, the network node is a radio base station, the plurality of data connections are radio access bearers, and the data packets are conveyed in the payload of protocol data units (PDU) in HS-DSCH data frames.

6. The method according to claim 3, wherein detecting a condition indicative of a congestion for any of the data connections involves:
    monitoring sequence numbers associated with incoming data packets, wherein said condition is triggered when the monitored sequence numbers indicate that data has been lost or received out of order.

7. The method according to claim 6, said network node being adapted for conveying data packets in compliance with an acknowledgement-based data transmission protocol for delivering a data stream from a sending host to a receiving host, wherein initiating the reduction of the bit-rate by causing discarding of a data packet on said selected data connection involves:
    manipulating said data packet in a way such that the receiving host upon receipt of the data packet will respond to the sending host with an indication that the data packet has not been duly received.

8. The method according to claim 7, wherein:
    said acknowledgement-based data transmission protocol is the Transmission Control Protocol, TCP;
    said sending host is a TCP server;
    said receiving host is a TCP client; and
    manipulating said data packet involves causing the TCP client to respond to the TCP server with multiple acknowledgements of one or more data packets received prior to said data packet.

9. The method according to claim 3, wherein the data connection for which a bit-rate reduction is to be caused is selected as the data connection among said data connections which yields the highest value of $r_{k\_avg}/w'_k$, where $w'_k$ is the adjusted weight, and $r_{k\_avg}$ is obtained by:
    measuring said experienced bit-rates $r_k$ for the data connections at a plurality of times; and
    low pass filtering the measured experienced bit-rates ($r_k$) to provide $r_{k\_avg}$.

10. The method according to claim 1, wherein the communication network is a transport network for a radio communication system, wherein the congestion control involves an Additive Increase Multiplicative Decrease (AIMD) operating principle, and wherein using the adjusted weights for the congestion control of the data connections involves modifying Additive Increase operations of said AIMD operating principle based on the adjusted weights.

11. The method according to claim 1, wherein the data connections are radio links to mobile terminals over an air interface in a radio communication system, wherein the network node is a radio base station having an air interface scheduler, and wherein the congestion control involves scheduling of downlink data to be transmitted to said mobile terminals in accordance with said calculated adjusted weights.

12. A non-transitory computer-readable medium storing a computer program product comprising computer program code that, when run by a programmable controller of a network node in a communication network, configures the network node to perform congestion control, wherein the network node is adapted to handle a plurality of data connections for conveying data between a first side and a second side of said communication network, wherein the congestion control involves associating the data connections with respective target weights for Quality-of-Service (QoS) bit-rate differentiation, and wherein the computer program code comprises program instructions to configure the network node to:
  obtain experienced bit-rates for the data connections;
  for each data connection:
    determine a time integrated difference between the data connection's targeted bit-rate according to its target weight, and its experienced bit-rate; and
    calculate an adjusted weight for QoS bit-rate differentiation based on the determined time integrated difference and the target weight; and
  use the adjusted weights for the congestion control of the data connections;
  wherein calculating the adjusted weight for an individual data connection involves calculating a scaling factor $v_i(t)$ for said individual data connection at a time instant t as:

$$v_i(t) = \max\left(0, v_i(t-1) + p\left(w_i(t)\frac{\sum_{k=1}^{N} r_k(t)}{\sum_{k=1}^{N} w_k(t)} - r_i(t)\right)\right),$$

where p>0 is a settable parameter which determines a tradeoff between an ability to adapt to environmental changes in said communication network on the one hand, and reduced adaptation accuracy of small continuous variations on the other hand, where $r_k(t)$ is the experienced bit rate, and where $w_i(t)$ is the target for the individual data connection.

13. A network node for a communication network, wherein said network node is adapted to handle a plurality of data connections for conveying data between a first side and a second side of said communication network, said network node comprising:

a relative bit-rate manager for providing proportional-fair-share congestion control which involves associating the data connections with respective target weights for Quality-of-Service (QoS) bit-rate differentiation; and
an integrating controller configured to:
obtain experienced bit-rates for the data connections;
for each data connection:
determine a time integrated difference between the data connection's targeted bit-rate according to its target weight, and its experienced bit-rate; and
calculate an adjusted weight for QoS bit-rate differentiation based on the determined time integrated difference and the target weight; and
provide the adjusted weights to the relative bit-rate manager;
wherein the relative bit-rate manager uses the adjusted rates for the congestion control of the data connections: and
wherein calculating the adjusted weight for an individual data connection involves calculating a scaling factor $v_i(t)$ for said individual data connection at a time instant t as:

$$v_i(t) = \max\left(0, v_i(t-1) + p\left(w_i(t)\frac{\sum_{k=1}^{N} r_k(t)}{\sum_{k=1}^{N} w_k(t)} - r_i(t)\right)\right),$$

where p>0 is a settable parameter which determines a tradeoff between an ability to adapt to environmental changes in said communication network on the one hand, and reduced adaptation accuracy of small continuous variations on the other hand, where $r_k(t)$ is the experienced bit rate, and where $w_i(t)$ is the target for the individual data connection.

* * * * *